J. M. WILLIAMS.
PROCESS OF TREATING FLOUR.
APPLICATION FILED SEPT. 4, 1906.
Reissued Dec. 28, 1909.
13,064.
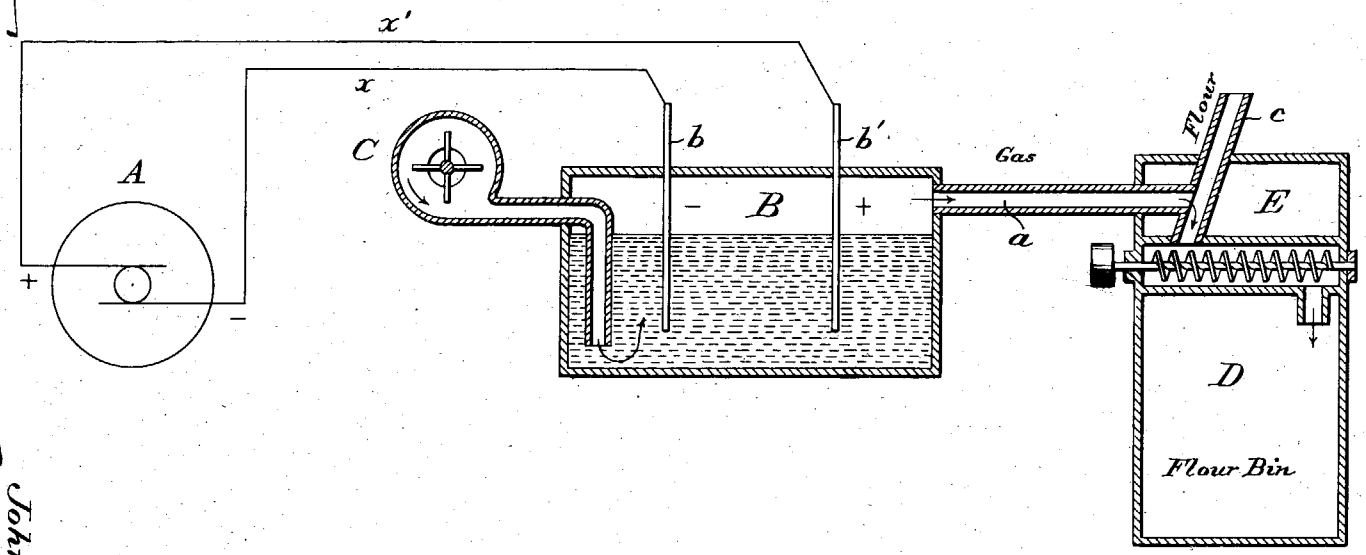
WITNESSES
H. C. Abbott
V. E. Nichols
INVENTOR
John M. Williams
BY Griffin & Bernhard
ATTORNEYS

UNITED STATES PATENT OFFICE.

JOHN M. WILLIAMS, OF GUTHRIE, OKLAHOMA, ASSIGNOR TO ELECTRIC CATALYTIC AIR COMPANY, A CORPORATION OF OKLAHOMA.

PROCESS OF TREATING FLOUR.

13,064. Specification of Reissued Letters Patent. Reissued Dec. 28, 1909.

Original No. 769,522, dated September 6, 1904, Serial No. 178,217. Application for reissue filed September 4, 1906. Serial No. 333,271.

*To all whom it may concern:*

Be it known that I, JOHN M. WILLIAMS, a citizen of the United States, residing at Guthrie, in the county of Logan, Oklahoma, have invented an Improvement in Processes of Treating Flour, of which the following is a specification.

My invention is in the nature of a process for whitening, aging, disinfecting, increasing the absorption of, and otherwise improving flour.

It consists in subjecting the flour while in a state of agitation to the gases formed by the electrolysis of water or other liquids or compounds capable of generating oxygen.

The figure is a diagrammatic view of an apparatus for carrying out my process.

A is a dynamo or electric generator or any other source of electric energy.

B is a tightly-closed tank for containing pure water or other liquids or compounds, which tank has within it two electrodes *b b'*, immersed in the water and connected by wires *x x'* with the opposite poles of the dynamo.

C is an air blower or pump for forcing air into the water of the tank.

D is a closed treating-chamber into which the flour is admitted through a chute-pipe *c*, which chute-pipe communicates with a pipe *a*, leading from the top of tank B, and discharges into a cylindrical casing E, within the treating-chamber. The casing E contains a spiral agitator or rotary conveyer and has an opening at the opposite end from that at which it receives the flour.

The liquid in tank B is rendered conductive by the addition of a little acid.

When the current from the generator A is turned on, the water in tank B is decomposed into its constituent gases—oxygen and hydrogen—which pass out pipe *a* into chute *c*, and, also, into the casing E, where the flour in descending is bathed or immersed in the gases and by agitation in casing E is brought into intimate surface contact with the gases. The flour after being thus acted upon drops into the bin. The air-blower C serves to energize the movement of gases through and dilutes the same to the required degree, so as to regulate the bleaching and disinfecting action, as circumstances may require. This air, it will be seen, is introduced below the level of the water in tank B, so that as it rises through the water it is scrubbed and purified thereby.

The gases liberated in my process have a very powerful effect in whitening, purifying, and disinfecting the flour without producing any deleterious by-products in the flour, and the process is carried out in a very simple and practical manner.

I am aware that flour has been treated by oxygen and ozone, and I make no claim to this broadly.

I am also aware that the electrolysis of water is well known as a method of separating water into its constituent gases—oxygen and hydrogen. I do not know, however, that the principle of electrolysis has ever been applied in the milling art as a process of aging flour, and it has in this art peculiarly novel and valuable results in that it avoids the dangers of explosion which the production of ozone by sparking discharges of static electricity involves. It avoids the production of by-products which give obnoxious and hurtful flavors to the flour, which substance by virtue of its absorbent qualities is especially liable to take on such objectionable odors. It is also distinguished from processes generating oxygen by the reaction of chemical agents in that the latter does not generate oxygen in a uniform way and is liable also to develop objectionable by-products, and the apparatus requires frequent cleaning. Furthermore, the same body of water which furnishes the two gases also acts to scrub and purify the air introduced. There is also no residuum left in the tank. Again, the forcible introduction of air energizes the movement of the aging-gases and carries them through and uniformly distributes them. Said air also by dilution of the gases furnishes means for regulating the activity of the gases to suit different conditions of flour and economizes the use of the gases by insuring its passage through and thorough distribution even in very limited quantity of the gases.

My process is very simple, cheap, cleanly and efficient, and is not limited to decomposing water alone, but may be employed with any other liquid capable of liberating oxygen by electrolysis.

Having thus described my invention, what I claim as new, and desire to secure by Letters Patent, is:

1. The process of whitening and purifying flour, which consists in decomposing an oxygen-yielding liquid by electrolysis and then immediately forcing the gaseous product through the flour substantially as described.

2. The process of whitening and purifying flour, which consists in decomposing an oxygen-yielding liquid by electrolysis, forcing the gaseous product along and diluting the same by the admixture with an extraneous blast of air introduced below the level of the liquid and delivering the mixture of gases into the flour substantially as described.

3. The process of whitening and purifying flour, which consists in decomposing by electrolysis a liquid which by electrolysis yields gaseous bleaching products, and then subjecting the flour to the action of the said gaseous products.

4. The process of treating flour, which consists in decomposing by electrolysis a liquid which by electrolysis yields gaseous bleaching products, mixing the resulting gaseous products with a diluting agent, and then subjecting flour to the action of the mixture thus produced.

5. The process of treating flour which consists in decomposing an oxygen-bearing liquid by electrolysis, diluting the resulting gaseous products with air, and then subjecting the flour to the action of the resulting mixture.

6. The process of treating cereals, such as flour, which consists in subjecting them to the action of bleaching agents resulting from the electrolytic decomposition of a solution of an acid.

7. The process of treating cereals, such as flour, which consists in subjecting them to the action of bleaching agents resulting from the electrolytic decomposition of a solution of a suitable electrolyte.

8. The herein described process which consists in electrolytically decomposing a solution of a chemical agent capable of generating cereal bleaching gases, diluting said gases, and subjecting the cereal to the action of the diluted gases.

9. The herein described process which consists in electrolytically decomposing a solution of a chemical agent capable of generating cereal bleaching gases, commingling said gases with air, and subjecting the cereal to the action of the resulting mixture.

10. The process of treating cereals, which consists in generating cereal bleaching gases by decomposing a solution of a suitable agent by an electric current and forcing the gases evolved to a cereal treating chamber by a current of air.

In testimony whereof, I have signed my name to this specification in the presence of two subscribing witnesses.

JOHN M. WILLIAMS.

Witnesses:

A. M. WILLIAMS,

H. G. FARQUHARSON.